United States Patent [19]

Thornley et al.

[11] Patent Number: 5,725,952
[45] Date of Patent: Mar. 10, 1998

[54] INSULATORS

[75] Inventors: David William Maute Thornley, Minety; Philip Roland Winfield, Latton, both of England; Jeffry Mackevich, Mibrae; Jeffrey Bennett, Sunnyvale, both of Calif.

[73] Assignee: Raychem Limited, Swindon, United Kingdom

[21] Appl. No.: 351,279

[22] PCT Filed: Jun. 8, 1993

[86] PCT No.: PCT/GB93/01210

§ 371 Date: Dec. 7, 1994

§ 102(e) Date: Dec. 7, 1994

[87] PCT Pub. No.: WO93/26016

PCT Pub. Date: Dec. 23, 1993

[30] Foreign Application Priority Data

Jun. 9, 1992 [GB] United Kingdom ............... 9212190
Jul. 8, 1992 [GB] United Kingdom ............... 9214492
Jul. 14, 1992 [GB] United Kingdom ............... 9214967

[51] Int. Cl.$^6$ ............................................ D02G 3/00
[52] U.S. Cl. .................. 428/378; 264/278; 264/279; 264/279.1; 361/127; 428/373; 428/375; 428/377; 428/392; 428/367; 428/395; 428/408
[58] Field of Search .............................. 264/278, 279, 264/279.1; 428/375, 378, 379, 392, 395

[56] References Cited

U.S. PATENT DOCUMENTS 5,298,301  3/1994  Midgley et al. .................. 428/379
5,389,442  2/1995  Arroyo et al. .................... 428/378

FOREIGN PATENT DOCUMENTS

| 0 117 025 A2 | 8/1984 | European Pat. Off. | B29C 25/00 |
| 0 373 476 A2 | 6/1990 | European Pat. Off. | H02G 15/18 |
| 2576076 A | 7/1986 | France | F16G 11/00 |
| WO 90/07779 | 7/1990 | WIPO | H01B 7/08 |
| WO 91/04563 | 4/1991 | WIPO | H01B 7/00 |

OTHER PUBLICATIONS

STN Access No. 86(8):122238(abstract of Cattanach et al., J. Polym. Eng., vol. 6, No. 1–4, 1986, pp. 345–362).
STN Access No. 86(5):62182 (abstract of Gore et al., Mater. Eng., vol. 103, No. 3, Mar. 3, 1986, pp. 47–50).
STN Access No. 85(12)181377 (abstract of Chang et al., Compos. Sci. Technol., vol. 24, No. 1, 1985, pp. 61–79).
Patent Abstracts of Japan, P field, vol. 14, No. 240, May 22, 1990, P. 115 P 1051 (abstract if appl'n No. 02–62506 (NTT)).

Primary Examiner—Jill Gray
Attorney, Agent, or Firm—Herbert G. Burkard; Yuan Chao

[57] ABSTRACT

A composite article is formed from yarn, comprising high strength fibres and fusible blocking material, and outer fusible material. The yarn is formed into its required shape and placed in a mould. The outer fusible material is introduced into the mould and its temperature is raised so as to melt the lower-melt temperature blocking fibres of the yarn. Under the action of temperature and pressure in the mould, the blocking material fuses so as to fill any interstices between the strength fibres, and the yarn is enclosed within the outer fusible material. The method is useful for forming electrical insulators of high strength glass fibre in the form of a loop (4) blocked against flow of moisture by polypropylene and enclosed within non-tracking polyethylene electrically insulating material (6).

13 Claims, 4 Drawing Sheets

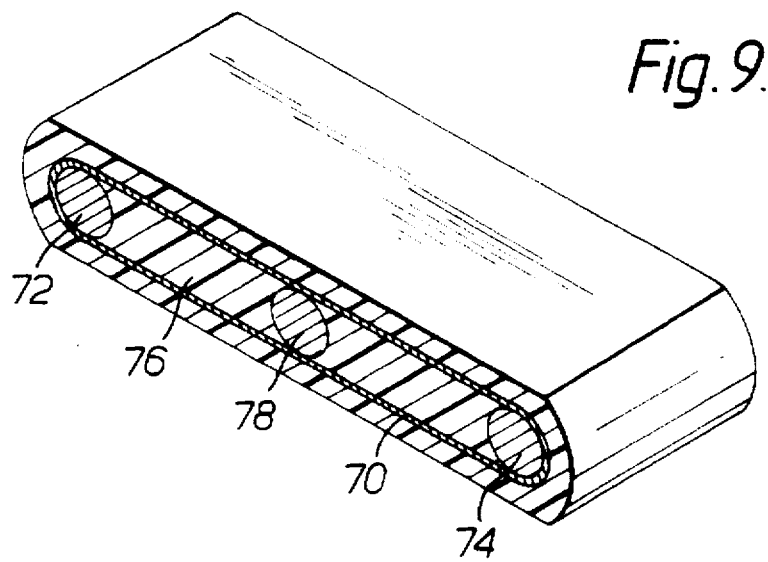
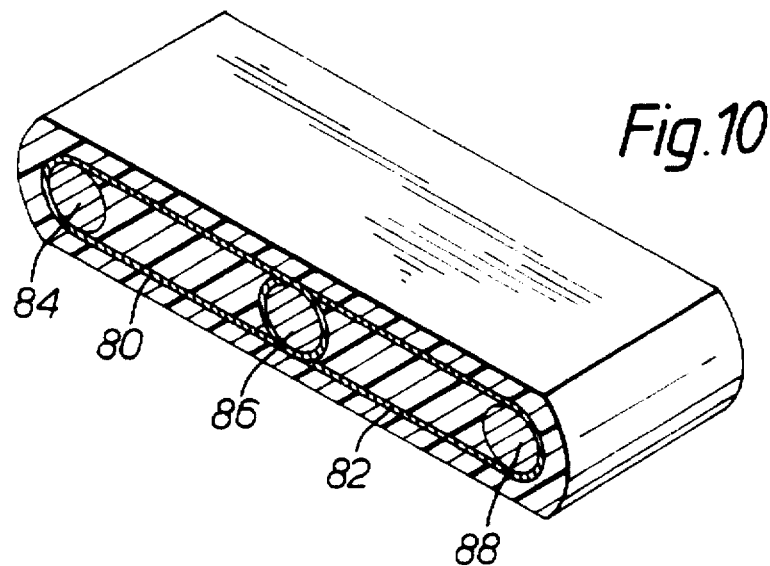
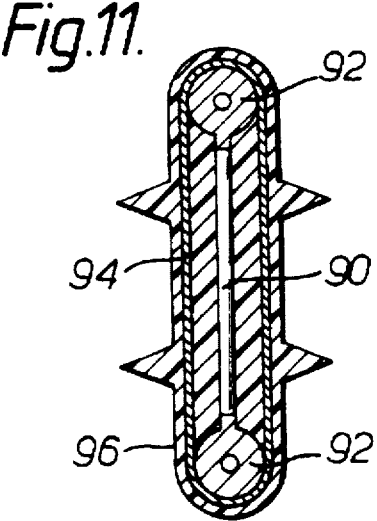

INSULATORS

This application claims the benefit under 35 U.S.C. §120 of the filing date of international application no. PCT/GB 93/01210, filed Jun. 8, 1994, published as WO93/26016 Dec. 23, 1993.

BACKGROUND OF THE INVENTION

1. Field of the Invention

The present invention relates to composite, for example electrically insulating, articles, including electrical insulators per se, and in particular to reinforced polymeric insulators.

Although the invention is preferably concerned with articles that perform a solely insulating function, and the ensuring description, for convenience, will relate mainly thereto, it is to be understood that in general the composite, for example, electrically insulating articles may also or alternatively perform other functions. Thus, the article may be a surge arrester, which for most of its time acts as an insulator but which, on the application of an over-voltage thereto, becomes conducting, in order to divert a surge of electrical power, from a lightning strike on associated electrical equipment for example, to earth. Broadly, however, the invention relates to composite articles whether electrically insulating or conductive.

2. Description of the Prior Art

Electrical insulators for use at voltages in excess of about 1 kV, and typically at 24 kV, can be formed from (i) porcelain, which has good electrical properties but is heavy and brittle, thus having low resistance to vandalism; (ii) glass fibre rod impregnated with an epoxy resin, which is of lighter weight but generally has inferior electrical performance to porcelain in outdoor applications, or must be environmentally sealed; or (iii) solid polymeric material, which combines the advantages of light weight and good electrical performance but has poorer load bearing properties. Furthermore, polymeric tubing and/or sheds (annular extensions) may be added to porcelain or glass fibre rods, or incorporated into polymeric insulator, for enhanced performance. Reference is hereby made to GB-A-1 292 276, US-A-4 045 604, GB-A-1 530 994, GB-A-1 530 995 and EP-A-0 253 622 (all to Raychem) and to GB-A-1 313 609 (BICC) for examples of such insulators and components.

One disadvantage of the use of glass (or other) fibre in the construction of an insulator is the possibility of moisture wicking along the fibre and thus providing an electrical short circuit between the terminals, usually one at each end, of the insulator that make electrical connection therewith. Such material however can provide high mechanical strength.

SUMMARY OF THE INVENTION

In general, it is an object of the present invention to provide a method of making a composite article of high strength that contains fibres, in such a way as to avoid, or at least reduce, the risk of moisture flowing along the fibres.

It is also an object of the present invention to provide an electrical insulator that provides the advantages of glass (or other high strength) fibre and of polymeric material, and to do so in a relatively inexpensive manner, whilst obviating, or at least reducing, the problem of moisture flowing from one end of the insulator to the other.

Thus, in one aspect, the present invention provides a method of making a composite article, the article comprising yarn enclosed within outer fusible material, wherein (i) the yarn, comprising a high strength fibre and fusible blocking material, is disposed in a mould, and (ii) the fusible material is introduced into the mould in a molten state, the temperature of the fusible material being at least equal to, and preferably above, the temperature at which the blocking material fuses, thereby to cause the blocking material to melt and flow between and around the strength fibres of the yarn so as to completely to enclose the fibres therewithin, and such that the blocked yarn is completely enclosed within the outer fusible material.

The term yarn is used to mean a plurality of fibres, which may be mono- or multi- filament fibres, and is considered to be synonymous with strand, tow, thread or tape.

By "fusible" is meant a material that flows on becoming hot and which either cures under the influence of the heat or solidifies on cooling, and thus includes thermoplastic and thermosetting materials.

Although the method is applicable to the manufacture of both insulating and non-insulating composite materials, for convenience, reference will hereinafter be made to use of the invention for manufacturing insulating articles.

The method of the invention thus provides blocking (against moisture transmission) of the high strength fibres in a single process that also forms the enclosing insulating body. The pressure of the insulating material entering the mould, especially when it is evacuated, assists in driving air out of the interstices between the fibres, and its temperature causes the blocking material to melt and to flow completely around the fibres. It will be appreciated that although the blocking material is expected to be molten at the temperature at which the outer insulating material flows into the mould, its complete encapsulation by the latter material ensures that the blocking material remains completely around the high strength fibres disposed for example unidirectionally or multi-directionally so as to form a tube, rod or loop. When used in electrically insulating applications, such blocking will thus prevent flow of moisture through the article and also prevent electrical tracking taking place between the inner structural core and the outer casing material of the article.

Such a manufacturing process allows the article to be made using a single moulding process at a comparatively low cost.

In one embodiment, there is provided by the method of the invention an electrical insulator, preferably of elongate configuration, comprising a substantially closed, preferably elongate, loop of high strength, preferably insulating, yarn of fibres that are blocked against the transmission of moisture therealong, the loop extending around means arranged for the attachment of electrical and mechanical connections to the insulator, and the loop being enclosed, preferably embedded, within insulating polymeric, and preferably substantially electrically non-tracking (in accordance with ASTM D2303), material that preferably forms an outer surface of the insulator.

Multi-filament glass fibres are preferred as the strength member of the yarn, but other high strength fibres, such as carbon, or aramid fibres, for example those sold under the trademark KEVLAR, may also be used. Each multi-filament fibre, as well as containing a plurality of glass filaments may also contain the blocking material, preferably in staple or continuous or other fibre form, or in powder form or as a coating on or within the strength fibres. The structure and blocking of such fibres, which forms part of the present invention, is disclosed in allowed, copending commonly assigned U.S. patent application of Park et al., Ser. No.

08/276,005, filed Jul. 15, 1994, the entire disclosure of which is incorporated herein by this reference. Alternatively, the fibres may be monofilament. In either case, blocking may avoid or reduce voids between filaments of the yarn and a surrounding polymeric material, such as the outer coating material of the insulator. The blocking of the or each filament of the yarn may be enhanced by the provision of blocking material around the or each filament.

The outer fusible and/or blocking material advantageously comprises a thermoplastic or a curable material, preferably polypropylene, polyethylene, silicone, polyamides, polyethyleneteraphthalate, polybutyleneteraphthalate, polyesters, acrylics, ethylene-vinyl-acetate copolymer, polyacrylonitrile, polymethylmethacrylate or low strength glass.

The fibrous blocking material, of mono- or multi-filaments, may be substantially axially aligned with the high strength fibres, may be wrapped helically therearound, or may be interwoven therewith to form a two- or three-dimensional mat. In the former cases, an elongate insulator, for example, so produced would have high tensile strength, and in the latter case, an insulator for use in cantilever applications could be produced.

Alternatively, the blocking material may be a powder or a coating deposited on or within the filaments of the high strength fibres.

The outer electrically insulating material advantageously comprises a polymeric material, preferably of a polyethylene or of a silicone polymer.

EP-A-0 265 265, and its corresponding patent publications in other countries, relates to an article incorporating fibres and discloses the blocking of such fibres against moisture (e.g. water or other liquid) wicking therealong, and the entire disclosure of that publication is enclosed herein by virtue of this reference.

In a preferred embodiment for making an insulator for example, the yarn is wound repeatedly, say of the order of two or three hundred times, around two mandrels that are spaced apart, transversely to the direction of winding, at the required separation of the end terminals of the insulator, forming an elongate loop of rounded rectangular configuration that is substantially closed, that is to say it is formed from a single yarn, which may itself comprise many filaments, and thus has only two exposed yarn ends. The yarn, held under tension between the mandrels, is then transferred to a mould for forming the polymeric insulating material therearound to provide the appropriately-shaped outer surface of the insulator—typically comprising one or more laterally-extending polymeric sheds. Under the higher temperature and pressure of the moulding operation, the blocking materials melts, or at least softens, so as to be urged between and around the glass filaments to form blocking along the path of the loop, at least at one point therealong and preferably throughout its entire length. Upon cooling and/or curing the blocked fibre cored, polymeric insulated component is removed from the mould. The mandrels can now be removed. The mandrels are envisaged to be rigidly secured together during cooling and/or curing to maintain their spacing apart. However, particularly when the insulator is to be used as a tension insulator, it may not be necessary for the blocked insulator to be rigid. It is also envisaged that electrical and mechanical connection end fittings may be provided as part of the mandrels, which may or may not be electrically conductive, and would thus subsequently remain in position. In the preferred embodiment therefore, the end fittings can be secured in position in the single operation that effects blocking of the fibres and also moulding of the insulating body of the insulator.

The mandrel or end fittings, as appropriate, which may be formed as a rod or tube or other suitable configuration, are advantageously concave at their outer surfaces, which receive the yarn thereover, to assist in the lateral retention of the yarn during the winding operation. The end fittings may be of metal, but any other suitable conductive material, such as high strength conductive polymer, may be used. Alternatively these components may be electrically insulating.

The polymeric material can be chosen to suit the application, but may typically be high density polyethylene or similar material, preferably containing a track-reducing filler, such as alumina trihydrate, to reduce the tendency of forming carbonaceous paths formed, in operation, from the flow of leakage current along the outer surface of the insulator. Suitable materials are disclosed for example in GB-A-1 337 951, GB-A-1 337 952 and GB-A-1 590 723 (Raychem). Other materials, such as thermosets for example, may also be used. Also, the polymeric material and/or the yarn may be cross-linked.

It is thus seen that the fibrous loop is completely encased within, and bonded to, the outer polymeric material, preferably such that the insulator is substantially void free.

The end fittings, which may be short lengths of metal tube that extend transversely to the (major axis of the elongate) loop, lie within the loop such that great mechanical strength is provided—typically the insulator can withstand an axial loading of 70 kN, which is the minimum requirement for its use as a 24 kV tension insulator.

The end fittings advantageously are so shaped as to spread out any electrical or mechanical stress thereon, for example so as to minraise the likelihood of fracturing the loop that is wound therearound. To this end, an oval or a pear shape is preferred to a circular cross-section, and preferably exhibits a low coefficient of friction with respect to the loop. Surfaces of the end fittings are preferably also rounded so as to avoid any points at which damaging electrical activity can occur.

It is to be understood that the term "insulator" as used herein refers to an article that performs an insulating function. It is envisaged that such an article may not perform an insulating function for the whole of its lifetime and/or may perform a function that is not solely insulating. In this respect, it is envisaged that the article may be associated with, for example may encompass within its insulating polymeric material, other functional components. For example the components may be varistors such as metal oxide components that allow the article to operate under certain conditions as a surge arrester to provide protection against lightning strikes or other over-voltages applied to associated equipment.

Embodiments of the methods of manufacture of an insulating article, and articles manufactured thereby, each in accordance with the present invention, will now be described, by way of example, with reference to the accompanying drawings, in which:

BRIEF DESCRIPTION OF THE DRAWINGS

FIGS. 9 to 11 schematically show sections through further embodiments of insulator.

DESCRIPTION OF THE PREFERRED EMBODIMENTS

Figure 1:
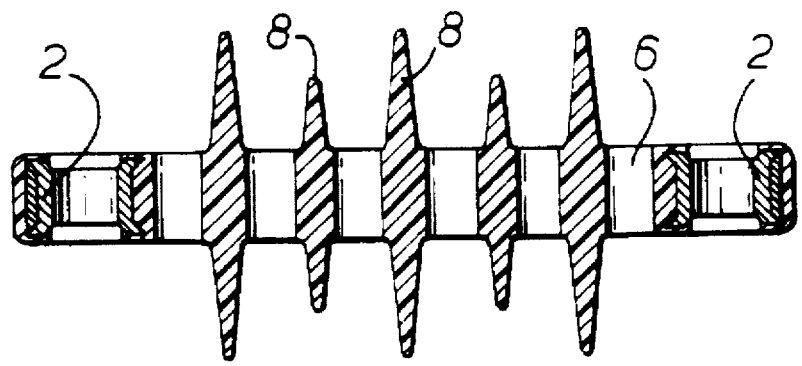
FIG. 1 is a sectional plan view of a first insulator.
Figure 2:
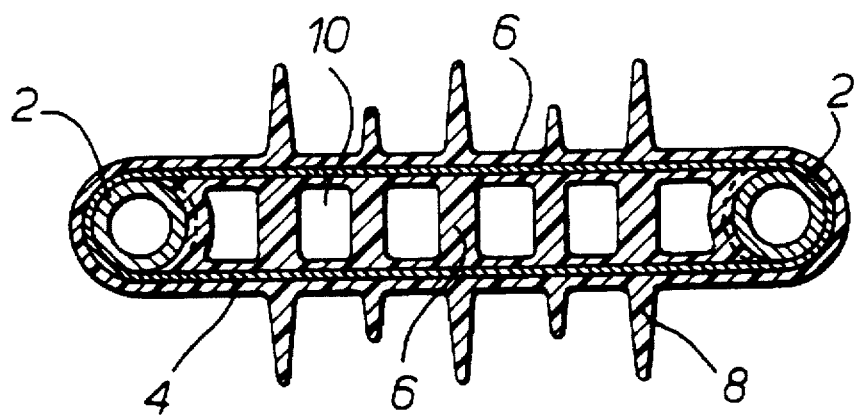
FIG. 2 is a sectional side elevation of the insulator of FIG. 1.
Figure 3:
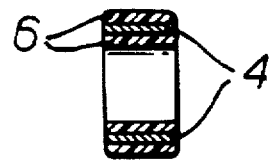
FIG. 3 is a sectional end view of the insulator of FIG. 1.

Referring to FIGS. 1 to 3 of the drawings, a pair of metal bobbins 2 are formed from a short length of metal tube whose outer surface, at least on one side is made concave. The bobbins 2 are held apart at the required separation of the end fittings of the completed insulator by means not shown. A single multi-filament glass fibre hybrid yarn containing polypropylene blocking material, is wound under tension around the bobbins 2, to engage the concave surfaces thereof, for approximately two hundred turns, to form an elongate loop 4 of rounded rectangular configuration. The resulting configuration is similar to that of a fan belt extending around two pulleys. The loop 4 comprises strength filaments of glass together with blocking filaments of polypropylene. Typically, the loop would be of length 200 mm, width 17 mm (ie. the length of the concave portion of the tubular metal bobbins 2), and a thickness 3 mm.

The loop 4, still under tension, is then transferred to an injection mould (not shown). The mould is evacuated and heated to remove air trapped within the yarn, and non-tracking insulating polymeric material 6 is injected at a temperature of about 125° C. into the 200° C. mould at a pressure of about 2000 psi. Under the effects of the high temperature and pressure of the mould, the blocking filaments of the fibre forming the loop 2 melt and flow so as completely to encase the glass components and to fill the interstices therebetween, thus forming a rigid, moisture-blocked loop, and the polymeric material subsequently cools and/or cures.

As shown, the polymeric material 6 is arranged to form the outer surface of the insulator. To this end the mould is arranged to provide a plurality of sheds 8 of different radial dimensions. From FIG. 2, it can be seen that the polymeric material extends completely around the outside of the loop 4 and also over its inner surface. Cut outs 10 are provided to reduce the weight, and also cost (due to less material 6 being used) of the insulator, and also to enhance the impedance to the flow of surface leakage currents therealong.

The metal bobbins 2 remain in position in the finished insulator, and serve electrically to connect the insulator under tension to suitable electrical equipment.

Although the strength fibres of the cores of the insulator of the present invention are shown and discussed as forming a straight loop, it is envisaged that the loop could be formed with a cross over during the filament winding step. Also, the loop could be twisted, once or a plurality of times, for example to form a tightly twisted configuration prior to insertion into the mould.

The use of simple end fittings, such as the pressed steel ring bobbins 2, in the present insulator dispenses with the need for the machined or forged fittings that hitherto have been necessary. With conventional crimp fittings for example a close tolerance is needed in order on the one hand to provide a sufficiently high gripping force and on the other hand to avoid crushing the glass fibres of a fibre rod insulator.

Figure 4:
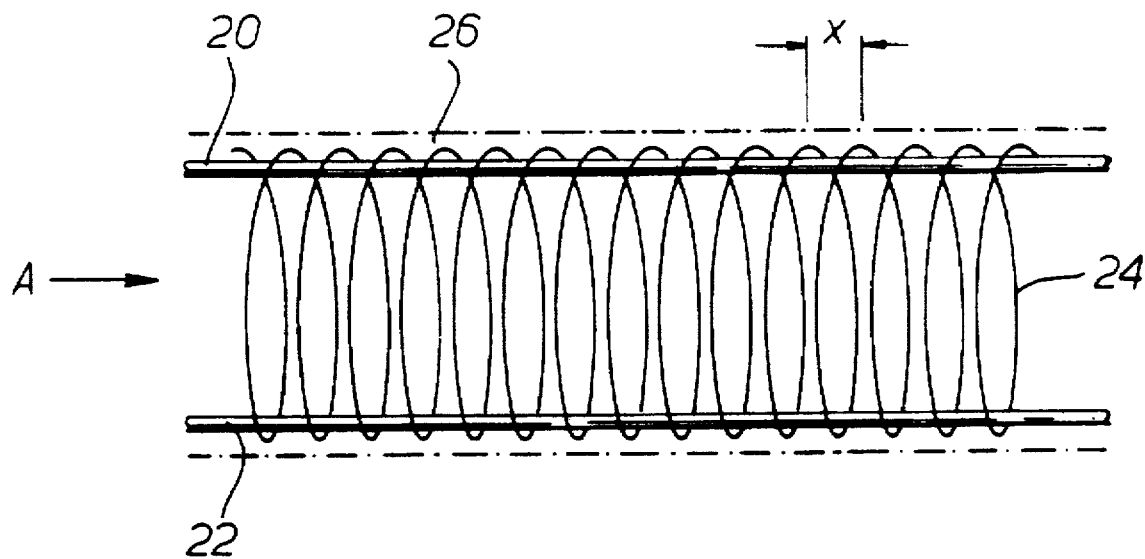
FIG. 4 shows diagrammatically a manufacturing method for the insulator.

Referring to FIG. 4, a continuous in-line process is depicted allowing comparatively inexpensive manufacture of part at least of the insulator.

A pair of spaced-apart, elongate metal rod mandrels 20, 22 with a continuous single glass fibre hybrid yarn 24 having blocking material associated therewith wound in helical configuration therearound are fed into a hopper (not shown) that delivers hot outer insulating polymeric material 26. On cooling, the yarn 24 becomes blocked against moisture transmission therealong and the yarn 24 and rods 20, 22 become completely encapsulated by the polymeric material 26. When cool, discrete blocked insulators can be cut to length by cuts transversely to the direction A to give an insulator of substantially uniform transverse dimension x.

Sheds (not shown) may then be added discretely, or by moulding in place, or by recovering a shedded tubular part therearound, thereby to provide an outer configuration as shown in FIG. 1.

In an alternative arrangement for the insulator of the present invention, it is envisaged that the insulation of the fibre-wound end fittings may be provided by two materials. An inner, relatively inexpensive material may be selected to have properties that facilitate blocking of the filaments of the yarn, and a compatible outer material may be selected to have good electrical surface properties, such as high resistance to the formation of conductive tracks therealong.

The fibrous loop used in the insulator may alternatively be formed as a braid, weave or knit providing a band, which may be slit to provide two or more loops of the required transverse dimension. In this embodiment, the continuous yarn would be arranged to extend in the direction in which, in use as a tension insulator for example, tension would be applied to the insulator.

Although only a single insulator is shown in the Figures, it is envisaged that by appropriate design of the end fittings and or interconnections, two or more of the insulators could be joined together to form a chain. For example, end fittings could be designed so as directly to interlock with one another, or a connecting link or other device could be provided. Such an extended insulator would then be suitable for operation at higher voltages.

Figure 5A:
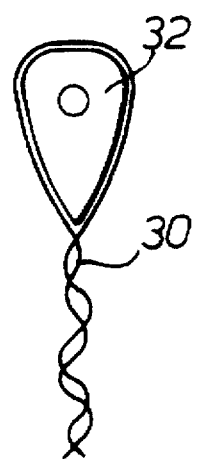
FIG. 5a and 5b show schematically two alternative embodiments of securement to end fittings.
Figure 5B:
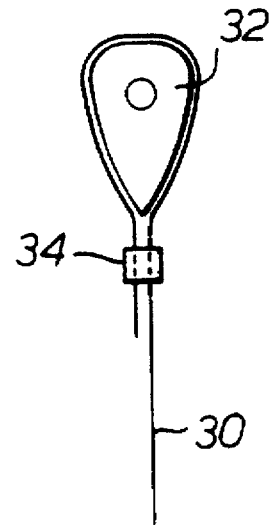

Referring to FIGS. 5a and 5b, a single yarn loop 30 is shown extending around one of two metal eyelets 32, which ultimately will form the end fittings of the insulator. In FIG. 5a, the yarn 30 extends between the two eyelets in a twisted configuration, whilst in FIG. 5b, a free end of the fibre 30 is secured to an adjacent yarn portion by a crimp 34. Outer polymeric material is subsequently applied to provide insulation and to produce and/or enhance the blocking of the yarn, as hereinbefore described.

Figure 6:
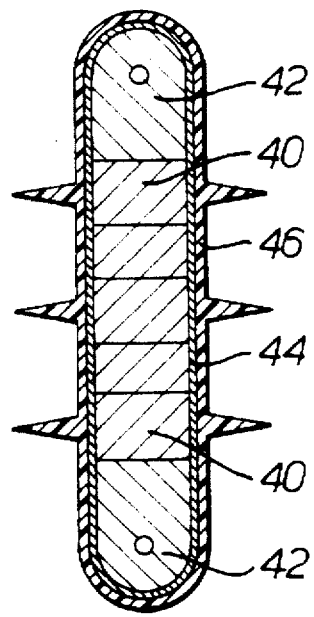
FIGS. 6 to 8 show partial views of three embodiment of surge arresters.

In FIG. 6 there is shown a stack of five zinc oxide varistor blocks 40 sandwiched between two metal terminals 42. A loop of a single yarn 44 extends around the blocks 40 and terminals 42 to retain them in axial compression. Outer polymeric insulation material 46 encapsulates the yarn 44 terminals 42 and blocks 40 completely, thereby to provide a shedded insulator arrangement that acts as a surge arrester having a blocked single yarn strength member 44. If desired, the polymeric material may be arranged to provide for venting from the varistor blocks 40 of any gas generated during their operation as a surge arrester, whilst maintaining complete encapsulation of the blocked loop 44.

Figure 7:
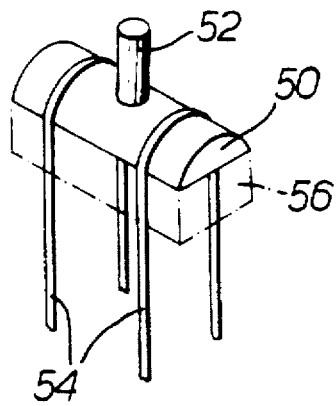

FIG. 7 shows an end portion of a surge arrester before its polymeric encapsulation, in which a metal terminal 50 is of semi-cylindrical configuration having a central connecting stud 52 that ultimately will project beyond the polymer. Two closed loops 54 of yarn are wrapped around respective shoulders of the terminal 50, and extends so as likewise to engage a corresponding terminal (not shown) at an opposite end of the arrester. One varistor block 56 is indicated. The loops 54 act as strength members to hold a stack of blocks 56 in compression between the two terminals 50.

Figure 8:
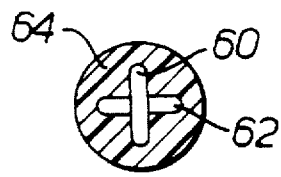

FIG. 8 shows a cut away plan view of a modified surge arrester, in which two single loops of yarn 60, 62 overlap each other in cruciform shape as they extend over an end fitting (not shown) of a surge arrester, in similar manner to the single loop arrangement shown in FIG. 6. The blocked loops 60, 62 are shown encapsulated in insulating polymeric material 64.

It is also envisaged that the insulator of the present invention may be used as a support and/or guide member for additional lines such as power and telecommunication conductors, or for other wiring.

Referring to FIG. 9, the closed yarn loop 70 is disposed around two end mandrels 72, 74 and blocked and embedded within polymeric insulation material 76 in the manner described hereinbefore. In this embodiment however, a further hole is defined by an intermediate mandrel 78. The mandrels 72, 74 and 78 may, but need not be electrically conductive. Supply lines may then be arranged to pass through respective ones of the mandrels. It will be appreciated that the apertures 10 in the polymeric insulating material 6 of the embodiment of FIGS. 1 to 3 may also be used for this purpose. The mandrels 72, 74, 78 or the apertures 10 are thus seen to support supply lines extending therethrough, and keep them spaced apart and insulated (where necessary) from each other.

FIG. 10 shows a modification of the insulator of FIG. 9, in which two closed loops 80, 82 of yarn are employed, in place of the single loop of FIG. 9, around respective pairs of three mandrels 84, 86, 88. The loops extend in substantially the same plane as each other.

As a further modification of the embodiment of FIG. 9, the single loop 70 may be formed into a figure-of-eight between the mandrels 72 and 74, thus being more closely wound around the intermediate mandrel 78, and achieving a result similar to that of FIG. 10.

FIG. 11 shows an insulator arrangement that is modified so as to include a rigid axial member that allows the insulator to be used in compression as well as in tension. A ceramic rod 90 has a mandrel 92 secured to each end thereof. A closed single loop 94 of yarn is then applied around the mandrels 92, and outer insulating material 96 applied therearound in the manner hereinbefore described. This insulator thus has tensile strength provided by the loop 94 and compressive strength provided by the rod 90, thereby providing a versatile component, for use as an aerial insulator on power cable systems for example.

It will be appreciated that the use of a closed, block loop of yarn in an insulator arrangement that also functions as a surge arrester, may be instead of or complementary to the use of other components for retaining the varistor blocks in position and/or restraining them in the event of any shattering during an over-voltage.

We claim:

1. A method of making a composite article, the article comprising yarn enclosed within outer fusible material, wherein
   (i) the yarn, comprising high strength fibers and fusible blocking material, is tensioned into a loop that is wound at least one time around two spaced-apart support members arranged so as to maintain the tension in the loop,
   (ii) the yarn and support members are disposed in a mold, and
   (iii) the outer fusible material is introduced into the mold in a molten state, the temperature of the outer fusible material being at least to the temperature at which the blocking material fuses, thereby to cause the blocking material to melt and flow between and around the strength fibers of the yarn so as completely to enclose the fibers therewithin, thereby to produce a blocked yarn, and such that the blocked yarn is completely enclosed within the outer fusible material.

2. A method according to claim 1, wherein at least one of the outer fusible material and the blocking material comprises a thermoplastic material.

3. A method according to claim 1, wherein the blocking material comprises a material that is cured in the mold on exposure to the temperature of the outer fusible material.

4. A method according to claim 1, wherein the yarn comprises high strength fibers selected from the group consisting of glass, carbon, and aramid.

5. A method according to claim 1, wherein the outer fusible material is electrically insulating and is substantially non-tracking.

6. A method according to claim 1, wherein said blocking material is in the form of fibers that are wrapped around said high strength fibers of the yarn.

7. A method according to claim 1, wherein said blocking material is in the form of fibers that are interwoven with said high strength fibers of the yarn.

8. A method according to claim 1, wherein the yarn is disposed uni-directionally or multi-directionally so as to form a rod or tube.

9. A method according to claim 1, wherein the yarn is substantially non-conductive.

10. A method according to claim 1, wherein the mold is evacuated subsequent to the disposal therein of the yarn and prior to the introduction of the outer fusible material.

11. A method according to claim 1, wherein the outer fusible material is introduced into the mold at a temperature above the temperature at which the blocking material fuses.

12. An elongate electrically insulating article comprising yarn enclosed within an outer fusible material, which article is made by the steps of:
   (i) locating yarn, comprising high strength fibers and a fusible blocking material under tension at least one time around two spaced apart support members so as to form a loop, the support members being arranged to maintain the tension in the loop,
   (ii) disposing the yarn and the support members in a mold, and
   (iii) introducing an outer fusible material into the mold in a molten state, at a temperature at least equal to the temperature at which the blocking material fuses, thereby to cause the blocking material to melt and flow between and around the strength fibers of the yarn so as to completely enclose the fibers therewithin, thereby to produce a blocked yarn, and such that the blocked yarn is completely enclosed within the outer fusible material.

13. An elongate electrically insulating article according to claim 12, containing at least one varistor block, thereby to function also as a surge arrester.

* * * * *